US010700542B2

(12) United States Patent
Gerovac et al.

(10) Patent No.: US 10,700,542 B2
(45) Date of Patent: *Jun. 30, 2020

(54) CONTROL SYSTEM FOR SYNCHRONOUS CAPACITOR SWITCH

(71) Applicant: Hubbell Incorporated, Shelton, CT (US)

(72) Inventors: Joseph Gerovac, Menomonee Falls, WI (US); Robert A. Traska, Cedarburg, WI (US)

(73) Assignee: Hubbell Incorporated, Shelton, CT (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/634,514

(22) Filed: Jun. 27, 2017

(65) Prior Publication Data
US 2017/0294786 A1    Oct. 12, 2017

Related U.S. Application Data

(63) Continuation of application No. 14/356,079, filed as application No. PCT/US2011/059142 on Nov. 3, 2011, now Pat. No. 9,698,600.

(51) Int. Cl.
| H02J 7/00 | (2006.01) |
| H02J 3/18 | (2006.01) |
| H02J 7/34 | (2006.01) |

(52) U.S. Cl.
CPC ............... *H02J 7/007* (2013.01); *H02J 3/18* (2013.01); *H02J 3/1821* (2013.01);
(Continued)

(58) Field of Classification Search
CPC ............ H02J 3/18; H02J 3/1821; Y02E 40/30
See application file for complete search history.

(56) References Cited

U.S. PATENT DOCUMENTS

| 3,364,587 A | 1/1968 | Brown et al. |
| 3,946,304 A * | 3/1976 | Thorsoe .................. G05F 1/445 323/326 |

(Continued)

FOREIGN PATENT DOCUMENTS

| CN | 2341310 | 9/1999 |
| CN | 2396560 | 9/2000 |

(Continued)

OTHER PUBLICATIONS

Vietnamese Patent Appl. No. 1-2014-01784 Office Action No. 5098/SHTT-SC1 dated Feb. 28, 2018, and translation (4 pages).

(Continued)

*Primary Examiner* — Jared Fureman
*Assistant Examiner* — Emmanuel Dominique
(74) *Attorney, Agent, or Firm* — Michael Best & Friedrich, LLP (57) ABSTRACT

A method of controlling the connection of a multiple phase power source to a plurality of capacitors. The method including, for each phase of the power source, determining a first voltage using a first voltage divider, the first voltage divider having a first high voltage resistor and a first low voltage resistor, wherein the first voltage is equal to a voltage across the first low voltage resistor. The method further including, for each phase of the power source, determining a second voltage across using a second voltage divider, the second voltage divider having a second high voltage resistor and a second low voltage resistor, wherein the second voltage is equal to a voltage across the second low voltage resistor. The method further including, for each phase of the power source, generating a close signal when the difference between the first voltage and the second voltage is approximately zero.

16 Claims, 9 Drawing Sheets

(52) U.S. Cl.
CPC ............. *H02J 7/0068* (2013.01); *H02J 7/345* (2013.01); *Y02E 40/30* (2013.01)

(56) References Cited

U.S. PATENT DOCUMENTS

| | | | | |
|---|---|---|---|---|
| 4,356,525 A * | 10/1982 | Kornrumpf | ............ | H02H 9/002 |
| | | | | 361/4 |
| 4,528,546 A | 7/1985 | Paoli | | |
| 4,645,997 A * | 2/1987 | Whited | ................ | H02J 3/1864 |
| | | | | 323/211 |
| 5,099,203 A * | 3/1992 | Weaver | ..................... | H03F 3/24 |
| | | | | 330/10 |
| 5,134,356 A * | 7/1992 | El-Sharkawi | ......... | H02J 3/1864 |
| | | | | 323/209 |
| 5,521,576 A | 5/1996 | Collins | | |
| 6,121,758 A * | 9/2000 | Bellina | ................ | H02J 3/1828 |
| | | | | 323/210 |
| 6,392,390 B1 * | 5/2002 | Ito | .......................... | H01H 9/563 |
| | | | | 323/207 |
| 6,921,989 B2 * | 7/2005 | Baranowski | ....... | H01H 11/0062 |
| | | | | 218/154 |
| 7,616,419 B2 * | 11/2009 | Koyama | .................. | H01H 9/56 |
| | | | | 361/71 |
| 7,633,185 B2 | 12/2009 | Rowell | | |
| 7,711,502 B2 * | 5/2010 | Koyama | ................ | H01H 9/563 |
| | | | | 307/135 |
| 8,164,273 B1 * | 4/2012 | Harrington | ............ | H05B 45/46 |
| | | | | 315/291 |
| 2008/0111429 A1 | 5/2008 | Rowell | | |
| 2009/0206818 A1 * | 8/2009 | Horan | ................... | H02M 5/257 |
| | | | | 323/311 |
| 2009/0284234 A1 * | 11/2009 | Jackman | ............... | H02J 3/1828 |
| | | | | 323/209 |

FOREIGN PATENT DOCUMENTS

| | | |
|---|---|---|
| CN | 101917009 | 12/2010 |
| EP | 0194574 | 9/1986 |

OTHER PUBLICATIONS

Australian Patent Application No. 2017206264 Examination Report No. 1 dated Jul. 25, 2018 (8 pages).
United Arab Emirate Application No. P464/2014 First Examination Report and Search Report (7 pages) dated Aug. 30, 2018.
Fourth Office Action issued by the State Intellectual Property of China for Chinese Patent Appl. No. 201180075704.X and translation (5 pages).

\* cited by examiner

CONTROL SYSTEM FOR SYNCHRONOUS CAPACITOR SWITCH

RELATED APPLICATIONS

This application is a continuation of U.S. patent application Ser. No. 14/356,079, filed May 2, 2014, which is a 371 of International Application No. PCT/US2011/059142 filed Nov. 3, 2011 the entire contents of which are hereby incorporated by reference.

BACKGROUND

The present disclosure relates generally to the field of electrical switch control systems. More specifically, the present disclosure relates to systems and methods for controlling a switch to selectively connect a power source e.g., a three phase, medium voltage power source) to one or more capacitors.

Switched capacitor banks are installed on poles and at sub stations to apply power factor correction (e.g., by altering the load phasing) to the power grid in response to the application and removal of heavy industrial inductive loads such as motors. When loads are not in phase, additional reactive currents increase transmission losses which results in wasted energy and the need for additional generating capacity. In some systems, a separate control senses the voltage-to-current phase relationship and commands the capacitor switch to open and close based on the relationship. Applying capacitors may help improve the transfer efficiency of the electrical energy being transmitted through the power grid. Medium voltage applications (e.g., 5 kV-38 kV) often include capacitors that are switched on and off based on power factor correction needs.

If a switch closes at a time when the AC voltage across the switch is not at a waveform zero, disturbances may occur due to heavy inrush currents as the capacitors are charged. The disturbances may include, for example, voltage dips, harmonics, resonance peaks and/or other undesirable effects on the electrical system. Such disturbances can cause problems with sensitive customer equipment, such as industrial VFD (variable frequency drive) motor controllers. Due to the mechanical and electrical complexity, the majority of medium voltage capacitor switches close randomly with respect to voltage. Some systems are configured with a resistor inserted in series with the switch to charge the capacitor to voltage, reducing the inrush current. Such systems may be acceptable for some applications, but may not perform in an acceptable fashion for more sensitive applications.

Controllers that are configured to close when the voltage across the capacitor switch is nearly zero volts are typically complex, expensive, and difficult to commission/install because they must handle a complex mixture of mechanical and electrical variations. Complex algorithms may be used to estimate the voltage across each switch, and such algorithms may require the installer to provide detailed information about the installation, such as the phase rotation (e.g., A-B-C phasing or A-C-B phasing), Wye/Delta capacitor connections and capacitor grounding (e.g., grounded or ungrounded). Some controllers blindly time their operations based on a single phase voltage sensor and calibration information regarding the electrical system to which the system is connected. For example, a voltage sensing transformer may reference only phase A of a three phase system. If the capacitor bank is connected in a grounded Wye configuration, it is expected that the electrical timing between zero volts of each phase is separated by 120 electrical degrees. The phase rotation must be known to configure such a controller.

Additionally, conventional zero-closing switches are configured to measure voltage on a single side of the switch (e.g., the power source side). When a Medium Voltage AC switch operating a capacitor opens, the current is cleared at a zero crossing. Since the current and voltage signals are out of phase 90 degrees due to the capacitor, a near peak trapped DC charge is left on the capacitor after the switch is opened. Capacitors have an internal resistor that is configured to slowly dissipate this energy until the voltage across the capacitor is brought to zero volts. In order to ensure that the capacitor has fully discharged (e.g., such that the voltage on the capacitor side of the switch is zero) and that closing the switch will not induce abnormally large inrush current (e.g., more than 6 times load capacitive load current), conventional zero-closing switches may be configured to wait a predetermined amount of time (e.g., five minutes) after the switch was last opened before closing the switch again. Closing the switch prior to the predetermined amount of time may produce an abnormally large inrush current (e.g., up to 80 times load current) as the source voltage meets a large trapped charge voltage on the capacitor. Specialized interlocking control equipment, training, and/or signage is often used to prevent closing of the switch prior to the passage of the predetermined amount of time.

There is a need for an improved control system for controlling the operation of switches used to selectively connect power sources to switched capacitors. There is also a need for a control system that is highly repeatable under a variety of environmental conditions. Further, there is a need for a control system that can be connected to a variety of different power system and/or capacitor configurations without the need for a substantial amount of specialized calibration to the individual types of configurations. Further still, there is a need for a control system that provides greater knowledge and awareness of the voltage conditions on both sides of the switch. There is also a need for a control system that does not require the switch to wait a predetermined amount of time after opening before the switch may close again.

SUMMARY

One exemplary embodiment of the disclosure relates to a method of controlling the connection of a multiple phase power source to a plurality of capacitors. Each phase of the multiple phase power source is electrically connectable to at least one of the plurality of capacitors through a switching device. The method comprises, for each phase of the multiple phase power source, determining a first voltage of a power signal for the respective phase of the power source using a first voltage divider that is electrically connected to a first terminal of the switching device for the phase. The method further comprises, for each phase, determining a second voltage across a capacitor that is electrically connected to a second terminal of the switching device for the phase. The second voltage is determined using a second voltage divider that is electrically connected to the second terminal of the switching device for the phase. The method further comprises, for each phase, generating a close signal configured to cause the switching device for the phase to close and electrically connect the respective phase of the power source to the capacitor when the difference between the first voltage and the second voltage is approximately zero.

Another exemplary embodiment of the disclosure relates to a control system for controlling the connection of a multiple phase power source to a plurality of capacitors. Each phase of the multiple phase power source is electrically connectable to at least one of the plurality of capacitors through a switching device. The control system comprises a control circuit. The control circuit is configured to, for each phase of the multiple phase power source, determine a first voltage of a power signal for the respective phase of the power source using a first voltage divider that is electrically connected to a first terminal of the switching device for the phase. The control circuit is further configured to, for each phase, determine a second voltage across a capacitor that is electrically connected to a second terminal of the switching device for the phase. The second voltage is determined using a second voltage divider that is electrically connected to the second terminal of the switching device for the phase. The control circuit is further configured to, for each phase, generate a close signal configured to cause the switching device for the phase to close and electrically connect the respective phase of the power source to the capacitor when the difference between the first voltage and the second voltage is approximately zero.

In one embodiment, the invention provides {text}.

In another embodiment the invention provides a method of {text}.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Before turning to the Figures, it should be noted that references to "front," "back," "rear," "upward," "downward," "inner," "outer," "right," "left," and/or other directional terms in this description are merely used to identify the various elements as they are oriented in the Figures. These terms are not meant to limit the element which they describe, as the various elements may be oriented differently in various applications.

Referring generally to the Figures, systems and methods for controlling the connection between a power source, such as a multiple-phase (e.g., three phase) power source, and one or more capacitors are provided according to various exemplary embodiments. A switch system may be comprised of a separate switching device or contactor for each phase of a multiple-phase system (e.g., three contactors for three phases). In various embodiments, for each phase, separate voltage dividers may be provided on each side of the switching device (e.g., one on the capacitor or load side, another on the power source or grid side). The voltage dividers may be used to determine the voltage on each side of the switching device for the phase. A control circuit may compare the determined voltages to decide if and when the voltage across the switch (e.g., the difference between the voltages on the opposite sides of the switch) is approaching approximately zero. The control circuit may then generate a signal (e.g., a close signal) that may be transmitted to the switching device to cause the switching device to close and form an electrical connection between the power source and the one or more capacitors at about the time when the difference in the voltages approaches approximately zero volts.

In various exemplary embodiments (e.g., systems and/or methods), various features may be utilized to control the connection between a power source and switched capacitors. For example, a close signal may be generated before the capacitor is fully discharged. The close signal may be generated a predetermined time prior to when the difference between the first voltage and the second voltage is expected to approach approximately zero. The predetermined time may be based on a time delay between a time when the switching device receives the close signal and a time when the switching device comes to rest in a closed position. The time delay may be determined by applying a voltage across the first and second terminals of the switching device at a first time, closing the switching device, and determining a second time at which the voltage approaches approximately zero, wherein the time delay comprises the difference between the first time and the second time.

A power supply may be provided that is configured to provide an approximately constant current to power the switching device.

The switching device may comprise a rod configured to be moved between a first position in which the switching device is in an open position and a second position in which the switching device is in a closed position. At least a portion of the first voltage divider or second voltage divider may be positioned within the rod. The voltage divider positioned within the rod may include one or more high voltage thick film resistors. The resistor(s) may be encapsulated within a urethane material.

Figure 1:
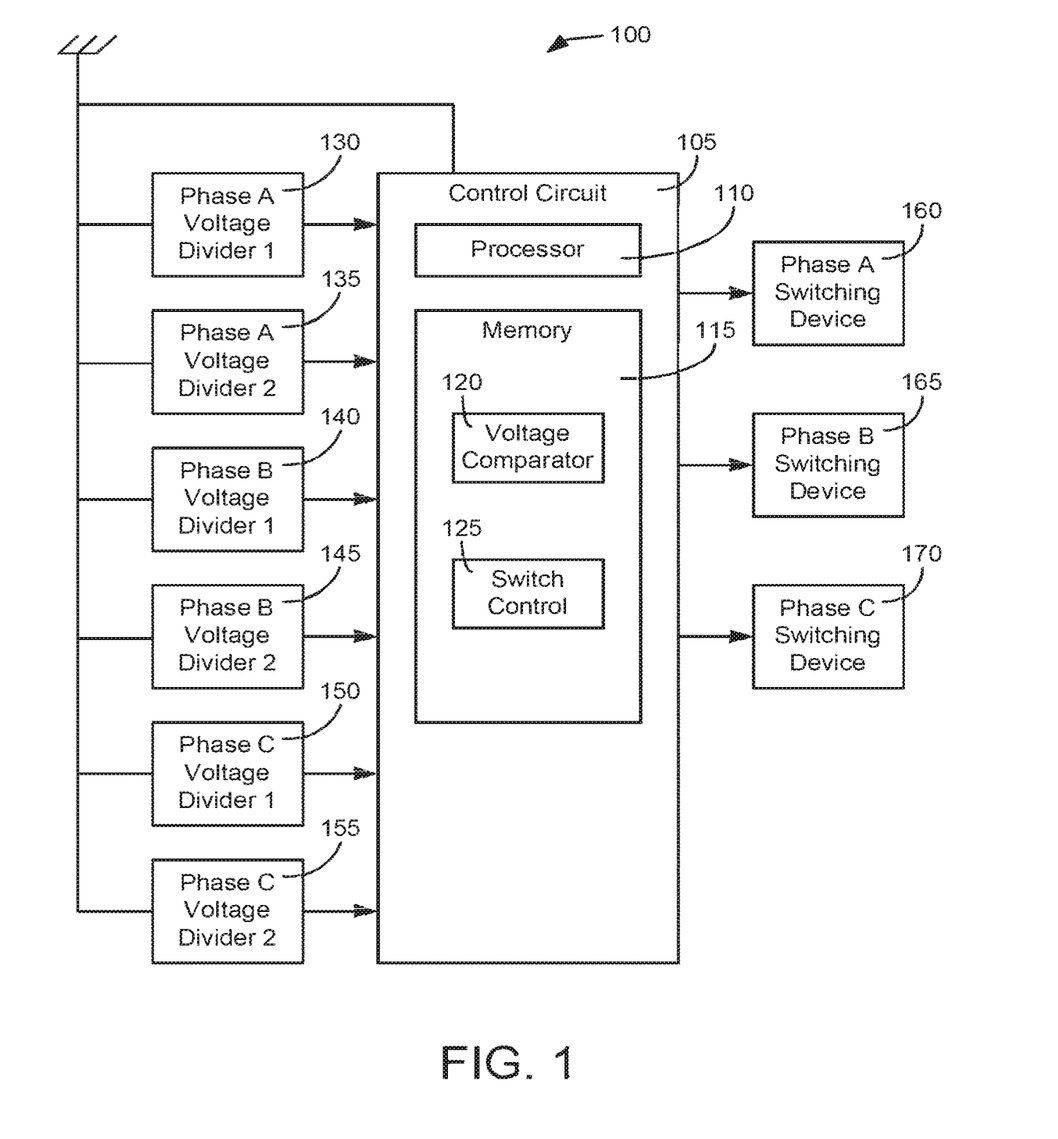
FIG. 1 is a block diagram of a control system that may be used to control the operation of switching devices for selectively connecting a three phase voltage source to switched capacitors according to an exemplary embodiment.

Referring now to FIG. 1, a block diagram of a control system 100 that may be used to control the operation of switching devices for selectively connecting a three phase voltage source to switched capacitors is shown according to an exemplary embodiment. System 100 maybe used to control the time at which three switching devices 160, 165, and 170 (e.g., one for each of the three phases of the power source) of a three phase switching system close and form an electrical connection between the power source and the capacitors. While system 100 is illustrated as being applied to a three phase system, the features of system 100 described herein may be applied to any single-phase or multiplephase power system.

System 100 includes a control circuit 105 configured to receive input signals from voltage dividers and generate control signals for controlling the operation of switching devices based on the input signals. In some embodiments, control circuit 105 includes a processor 110 and a memory 115. Processor 110 may be any type of general or special purpose processing circuit or device. Memory 115 may be any type of machine-readable medium, such as flash memory, RAM, ROM, etc.

Memory 115 may include one or more modules configured to perform various functions of control circuit 105. For example, memory 115 may include a voltage comparator module 120 configured to compare voltages received from voltage dividers and determine when the difference between the voltages is approaching approximately zero. Memory 115 may additionally or alternatively include a switch control module configured to generate signals (e.g., close and/or open signals) configured to instruct the switching devices to open or close. In some embodiments, the modules may be implemented using machine-executable instructions stored in memory 115 and executable by processor 105. In some embodiments, some or all of the functions of control circuit 105 such as comparing input voltages and/or sending control signals to switching devices, may be implemented using circuitry other than a processor and/or memory.

Control circuit 105 is configured to receive voltage signals from at least two voltage dividers for each phase of the multiple-phase power system. As illustrated, control circuit receives a voltage input signal from a first voltage divider 130 for phase A (e.g., a power source-side voltage divider for phase A), a second voltage divider 135 for phase A (e.g., a capacitor or load-side voltage divider for phase A), a first voltage divider 140 for phase B (e.g., a power source-side voltage divider for phase B), a second voltage divider 145 for phase B (e.g., a capacitor or load-side voltage divider for phase B), a first voltage divider 150 for phase C (e.g., a power source-side voltage divider for phase C), and a second voltage divider 155 for phase C (e.g., a capacitor or load-side voltage divider for phase C). In some embodiments, a low voltage terminal or lead of each of the voltage dividers and/or of control circuit 105 may be connected to the same low voltage reference or ground terminal.

Control circuit 105 is configured to generate signals for transmission to phase A switching device 160, phase B switching device 165, and phase C switching device 170 based on the voltage inputs from the respective phase voltage dividers. For example, control circuit 105 is configured to generate control signals for phase A switching device 160 based on the voltage inputs from voltage dividers 130 and 135, to generate control signals for phase B switching device 165 based on the voltage inputs from voltage dividers 140 and 145, and to generate control signals for phase C switching device 170 based on voltage inputs from voltage dividers 150 and 155. In some embodiments, a single control circuit may be used to control the operation of switching devices for all phases. In other embodiments, multiple control circuits (e.g., a control circuit for each phase) may be utilized to control the operation of the switching devices.

Figure 2:
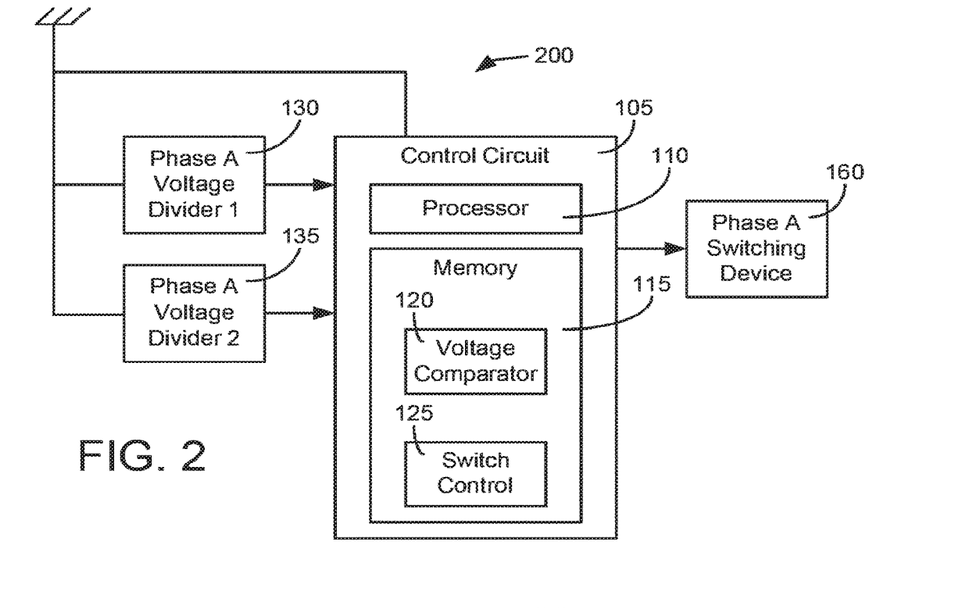
FIG. 2 is a single-phase block diagram of the control system shown in FIG. 1 according to an exemplary embodiment.

Referring now to FIG. 2, a block diagram of single-phase system 200 of control system 100 that is illustrated in FIG. 1 is shown according to an exemplary embodiment. Single-phase system 200 illustrates the operation of control circuit 105 in controlling the connection of a single phase A to one or more capacitors using phase A switching device 160. Control circuit 105 is configured to measure the voltage on the source or grid side of switching device 160 using voltage divider 130. The voltage measured using voltage divider 130 may represent the voltage (e.g., alternating current, or AC, voltage) of a singlephase source power signal being transmitted on the phase A pole of the multiple-phase power system. Control circuit 105 is configured to measure the voltage on the load or capacitor side of switching device 160 using voltage divider 135. The voltage measured using voltage divider 135 may represent the voltage (e.g., direct current, or DC, voltage) across the capacitor (e.g., due to the energy stored in the capacitor).

Control circuit 105 may be configured to monitor the difference between the voltages on the source and load sides of switching device 160. If the difference between the voltages does not approach approximately zero volts, control circuit 105 may be configured to not generate a close signal and switching device 160 may remain in an open configuration. When the difference between the voltages on the source and load sides approaches approximately zero (e.g., if the voltages are approximately the same), control circuit 105 may be configured to generate a close signal and transmit the signal to switching device 160, causing switching device 160 to close and form an electrical connection between the power source and the capacitor(s). In some embodiments, control circuit 105 may be configured to maintain closure of the switching devices within +/−10 degrees of zero-crossing. Because switching device 160 closes when the voltage difference between the source and load sides is approximately zero volts, no substantial in-rush current should flow in the resulting circuit and undesirable effects of connecting to the capacitor(s) are be reduced or avoided.

Some existing designs utilize voltage transformers to provide a reference signal for proper electrical contact closure sequencing. Because voltage transformers can be configured in either phase to phase or phase to ground wiring configurations, such variations must be accounted for in the control scheme and configured upon setup.

By utilizing voltage dividers on both sides of switching device 160, the instantaneous DC component of the voltage is available. Control circuit 105 can use the voltage divider inputs to determine the actual voltage differential across switching device 160. Accordingly, control circuit 105 can independently determine the voltage zero for each phase and does not need to have knowledge of the phase rotation (e.g., A-B-C or A-CB phasing) of the power system. Further, because the voltage dividers are used to determine the actual voltage on each side of switching device 160 independently (as opposed to inferring the voltage on one side based on a measurement of the other side and knowledge of the configuration of the power system), control circuit 105 need not be calibrated with the specific configuration of the power system (e.g., Delta/Wye, grounded/ungrounded, etc.) in order to determine the appropriate zero or near-zero point at which switching device 160 should close. Further, no substantial in-rush current should occur as long as the voltage differential between the two sides of switching device 160 is approximately zero, even if the capacitor is still holding a charge. Accordingly, control circuit 105 does not need to wait a predetermined amount of time (e.g., five minutes) after the capacitor has last opened before switching device 160 can be closed again.

In some embodiments, control circuit 105 may also be used to generate control signals to cause switching device 160 to open. Current transducers may be used to determine an appropriate zero-current opening time. In some embodiments, control circuit 105 may be configured to generate an open signal without using current transducers by monitoring the load-side voltage signal. Because the capacitors cause the current signal to lead the voltage signal on the load side by 90 degrees, the proper zero-current opening time may be calculated by control circuit 105.

Figure 3:
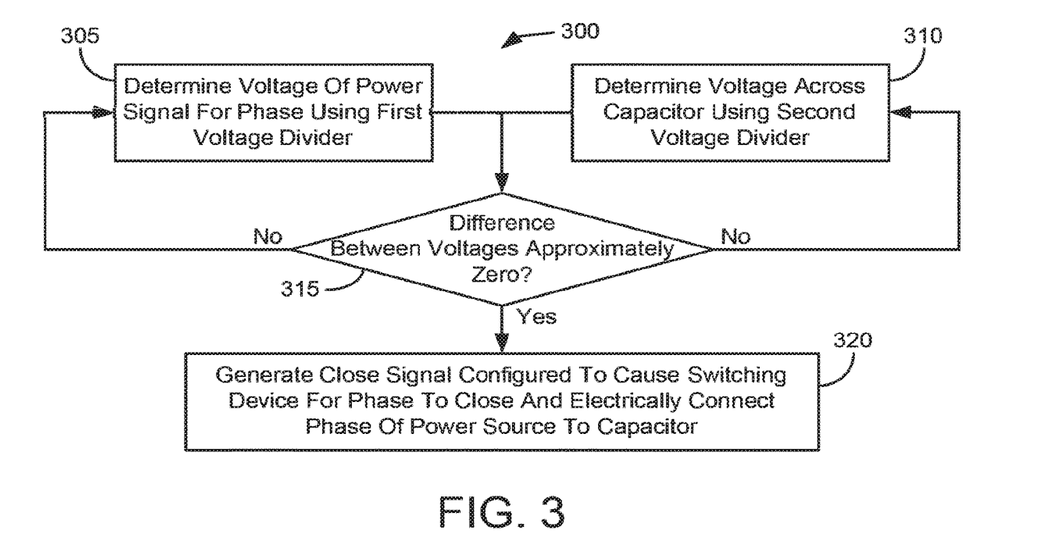
FIG. 3 is a flow diagram for a process of controlling the operation of a switching device for connecting a voltage source to a switched capacitor according to an exemplary embodiment.

Referring now to FIG. 3, a flow diagram for a process 300 of controlling the operation of a switching device for connecting a voltage source to a switched capacitor according to an exemplary embodiment. In various embodiments, process 300 may be implemented using control circuit 105 in a single phase as illustrated in FIG. 2 and/or applied to multiple phases as illustrated in FIG. 1. As illustrated in FIG. 3, process 300 includes operations that may be used to control the connection of a single phase of a power system to one or more capacitors. In some embodiments, a control circuit may be configured to utilize process 300 to control each phase of a multiple-phase power system independently (e.g., such that process 300 is repeated for each phase).

The control circuit may be configured to determine a source-side voltage associated with a power signal for a phase of a connected power system using a voltage signal received from a first voltage divider (operation 305). The first voltage divider may be electrically connected to the source side of a switching device for the phase. The control circuit may be configured to determine a load-side voltage, or voltage across a capacitor connected to a second side of the switching device, using another voltage signal received from a second voltage divider for the phase (operation 310). The second voltage divider may be electrically connected to the load, or capacitor, side of the switching device for the phase.

The control circuit may be configured to determine a voltage differential across the switching device for the phase using the voltage signals from the first and second voltage dividers. The control circuit may be configured to monitor the voltage differential to determine if the voltage differential is approaching approximately zero volts (e.g., such that the source-side voltage and the load-side voltage are approximately the same) (operation 315). If the voltage differential is not approximately zero volts, the control circuit may continue to monitor the voltage signals received from the voltage dividers and may not generate a signal to cause the switching device for the phase to open. When the voltage differential is determined to be approximately zero, such as when the capacitor is fully discharged and the source side voltage is zero, or when the same non-zero voltage is present in the source power signal for the phase and across the capacitor, the control circuit may be configured to generate a close signal and transmit the close signal to the switching device (operation 320). The switching device may be configured to close and electrically connect the respective phase or pole of the power system to the capacitor(s) when the voltage differential across the switching device is approximately zero volts in response to receiving the close signal from the control circuit.

Figure 4:
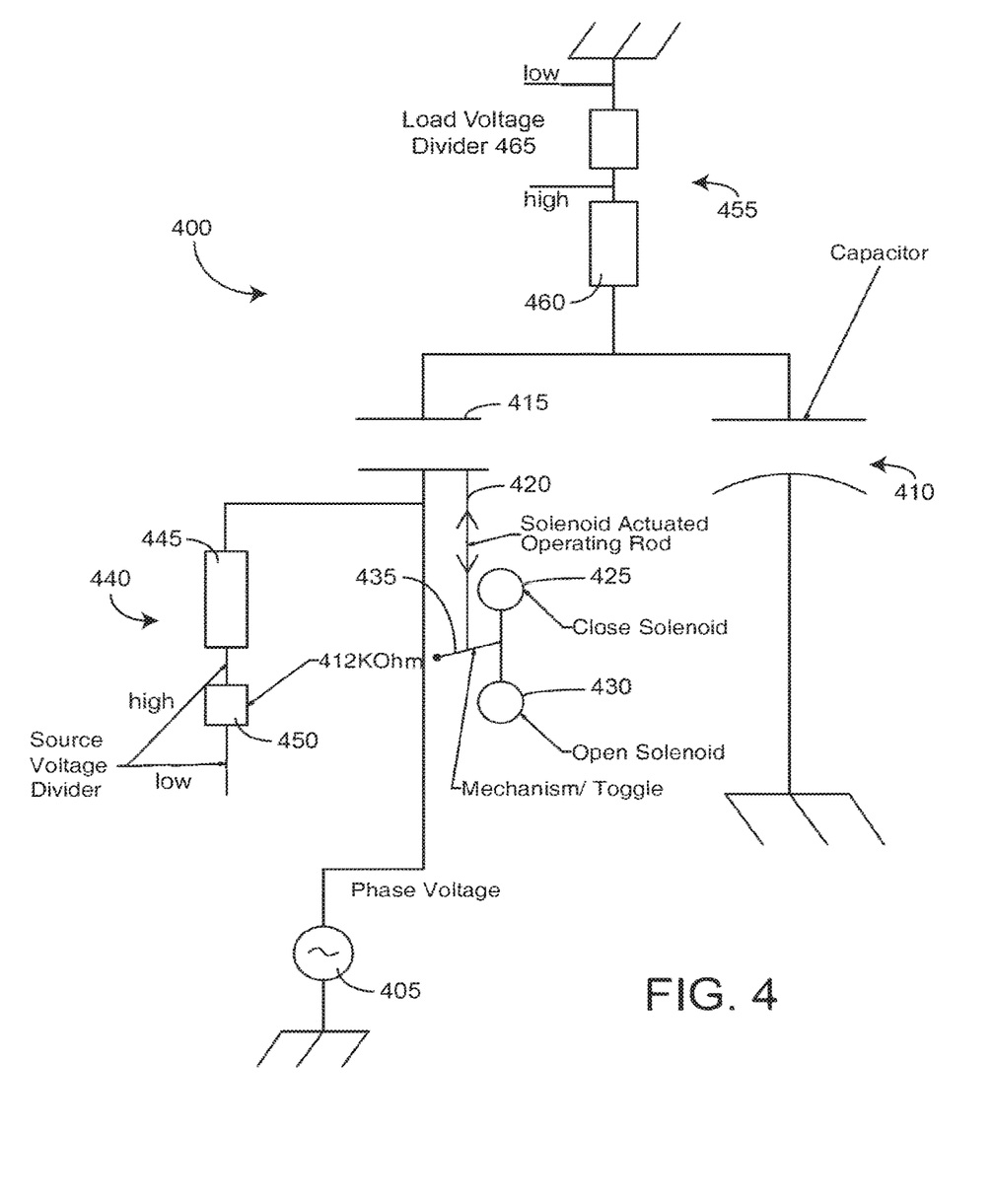
FIG. 4 is a single-phase schematic electrical diagram of a control system for controlling the operation of a switching device for connecting a voltage source to a switched capacitor according to an exemplary embodiment.

Referring now to FIG. 4, a single-phase schematic electrical diagram 400 of a control system for controlling the operation of a switching device for connecting a voltage source to a switched capacitor is shown according to an exemplary embodiment. Electrical diagram 400 may represent a high-level electrical implementation of control system 200 and/or a single phase of control system 100 in some exemplary embodiments. In some embodiments, the circuit illustrated in electrical diagram 400 may be applied to control the connection of a voltage source to a switched capacitor using one or more operations of process 300.

As illustrated in electrical diagram 400, the control system includes a power source 405 (e.g., an AC voltage source, such as a high voltage power source from a power grid) and a capacitor 410 (e.g., one or more capacitors, such as in a capacitor bank) that are selectively connectable through the use of a switching device. In some embodiments, the voltage of power source 405 may be as high as 22 kV or higher. The switching device includes a pair of contactors 415 that may be moved in contact with one another (e.g., in a closed position of the switching device) and separated from one another (e.g., in an open position of the switching device) to enable and disable, respectively, an electrical connection between power source 405 and capacitor 410.

In some embodiments, one or both of contactors 415 may be operatively moved in and out of contact with the other contactor 415 through the use of a solenoid assembly or other type of actuator. In electrical diagram 400, two solenoid devices are used in conjunction with an operating rod 420 to move the source-side contactor into and out of contact with the load-side (e.g., capacitor-side) contactor. A close solenoid 425 is configured to push operating rod 420 up, moving the source-side contactor into contact with the capacitor-side contactor. An open solenoid 430 is configured to pull operating rod 420 down, moving the source-side contactor out of contact with the capacitor-side contactor. A toggle switch 435 or other mechanism may be used to control the operation of the solenoid devices. In some embodiments, one solenoid device may be used to perform both the opening and closing functions of the switching device. In some embodiments, a different type of actuating device may be used to open and close the connection between power source 405 and capacitor 410.

Electrical diagram 400 also includes two separate voltage dividers, one electrically connected to the source side of contactors 415 and one electrically connected to the capacitor side of contactors 415. Source-side voltage divider 440 includes two or more resistors and may be used by a control circuit to determine the voltage (e.g., AC voltage) of power source 405 at any given point in time. Voltage divider 440 may be connected in a parallel configuration with power source 405, such that a high voltage side of voltage divider 440 may be electrically connected with a high voltage side of power source 405, and a low voltage side of voltage divider 440 may be connected to a low voltage terminal (e.g., ground terminal, very high impedance element, etc.). In such a configuration, the voltage across voltage divider 440 is the same as the voltage of power source 405.

Voltage divider 440 may include at least a first resistor 445 and a second resistor 450. Resistor 445 may be a high voltage resistor configured to withstand a high voltage drop across the resistor without damaging the resistor, such as a high voltage thick film resistor (e.g., 1 GΩ, 10 GΩ, 10 MΩ, etc.). Resistor 450 may be a lower voltage resistor (e.g., as compared to resistor 445) and may be configured such that the voltage drop across resistor 450 is substantially lower than the voltage drop across resistor 445 during operation. A control circuit may be configured to measure the voltage across resistor 450 (e.g., by using an electrical connection, such as a wire lead, to a high voltage side of resistor 450 and/or a low voltage side of resistor 450). The voltage across resistor 450 can be used to determine the voltage across the entire voltage divider 440 because the voltage across resistor 450 is directly related to the total voltage based on the relative resistance values of resistors 445 and 450. The total voltage across voltage divider 440 (and, accordingly, the voltage of power source 405) can be determined according to the following expression, where VVD440 represents the total voltage across voltage divider 440, $R_{445}$ and $R_{450}$ represent the resistance values of resistors 445 and 450, respectively (e.g., in ohms), and $V_{R450}$ represents the voltage measured across the smaller resistor 450:

$$V_{VD440} = ((R_{445} + R_{450})/R_{445}) \times V_{450}$$

By measuring across the smaller resistor 450, the voltage may be reduced to a level that is safe for the electronics of the control circuit used to measure the voltage value. In some embodiments, both resistors 445 and 450 may be included as part of a voltage divider assembly. In some embodiments, resistor 445 may be included in a separate assembly from resistor 450. For example, resistor 445 may be included in an assembly configured to encapsulate a high voltage resistor, and resistor 450 may be mounted or embedded on a circuit board, such as a circuit board of the control circuit.

A second voltage divider 455 is electrically connected to the capacitor side of the contactors 415. Capacitor-side voltage divider 455 includes two or more resistors and may be used by the control circuit to determine the voltage (e.g., DC voltage) across capacitor 410. Voltage divider 455 may be connected in a parallel configuration with capacitor 410, such that a high voltage side of voltage divider 455 is electrically connected to a high voltage side of capacitor 410 and a low voltage side of voltage divider 455 is electrically connected to a low voltage terminal.

Capacitor-side voltage divider 455 may include at least a first resistor 460 and a second resistor 465. Resistor 460 may be a high voltage resistor and resistor 465 may be a lower-voltage resistor (e.g., resistor 460 might have a higher resistance value than resistor 465). The control circuit may be configured to measure the voltage across the smaller resistor 465 and use that voltage value to determine the voltage across the entire voltage divider 455 and, accordingly, the voltage across capacitor 410. The voltage across voltage divider 455 may be determined in the same manner described above with respect to voltage divider 445. In various embodiments, resistors 460 and/or 465 may have the same or different resistance values as resistors 445 and 450, respectively.

Figure 5:
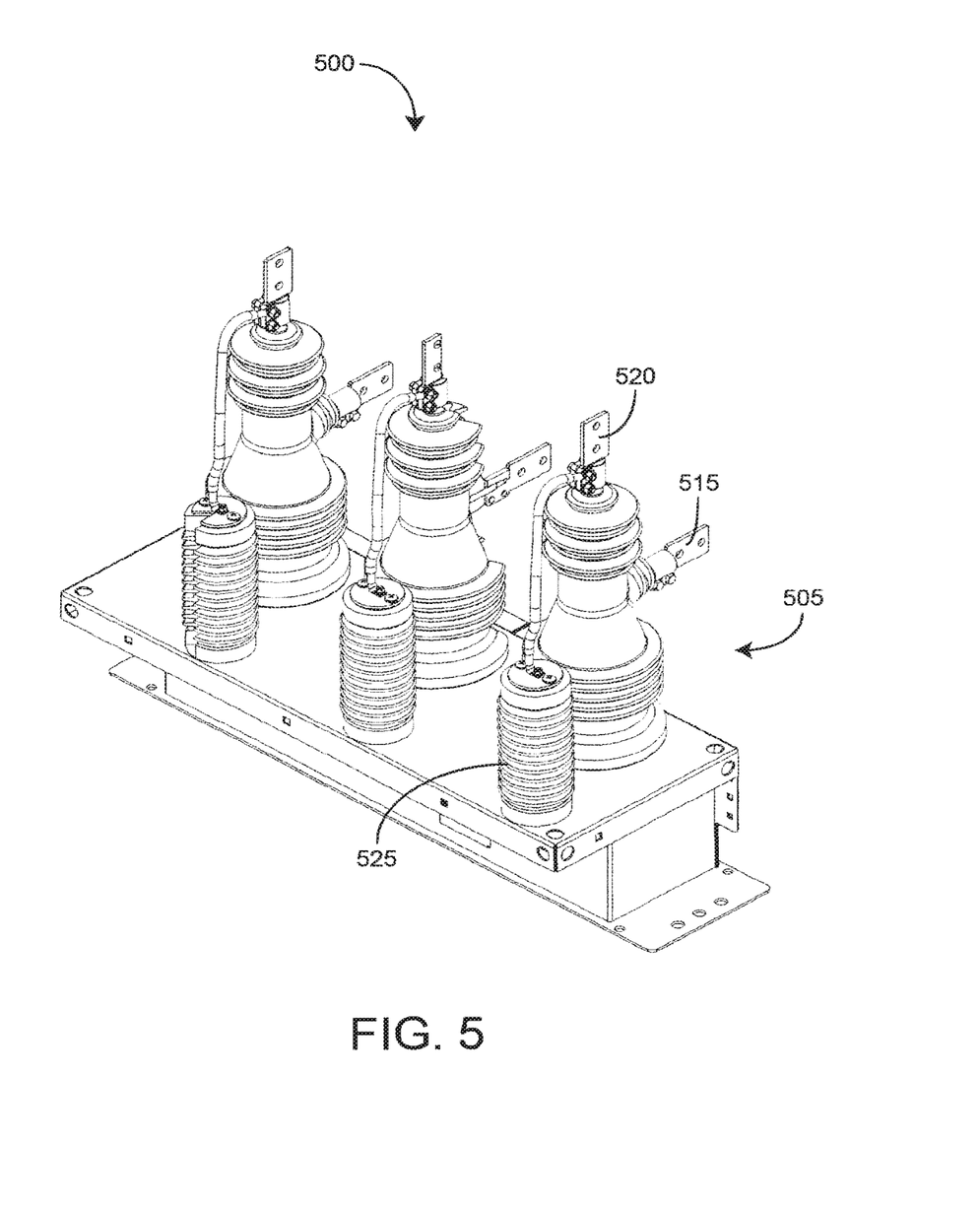
FIG. 5 is a perspective view of a control system that may be used to control the operation of switching devices for selectively connecting a three phase voltage source to switched capacitors according to an exemplary embodiment.

Referring now to FIG. 5, a perspective view of a control system 500 that may be used to control the operation of switching devices for selectively connecting a three phase voltage source to switched capacitors is shown according to an exemplary embodiment. System 500 includes three single-phase switching systems 505, one for connection to each phase or pole of the power source. Each single-phase system 505 includes a housing 510 configured to enclose a switching device used to connect and disconnect the phase to a capacitor. The phase of the power source may be connected at a terminal 515, and the capacitor(s) may be connected at another terminal 520. Each single-phase system 505 includes a source-side voltage divider (not visible in FIG. 5) and a capacitor-side voltage divider 525 (an external voltage divider electrically connected to a capacitor or load side of the switching device for the phase) that may be used to determine the voltages at each side of the switching device for the phase. The switching devices and voltage dividers for all three phases may be provided in one integrated control system such that control system 500 is a "hook up and go" type system that is as easy to install as non-zero-close systems. In some embodiments, a system similar to control system 500 may be used in the implementation of various systems and methods described herein (e.g., systems 100 and/or 200, process 300, the electrical system illustrated in diagram 400, etc.) and control system 500 may incorporate various features described with respect to those systems and methods.

Figure 6:
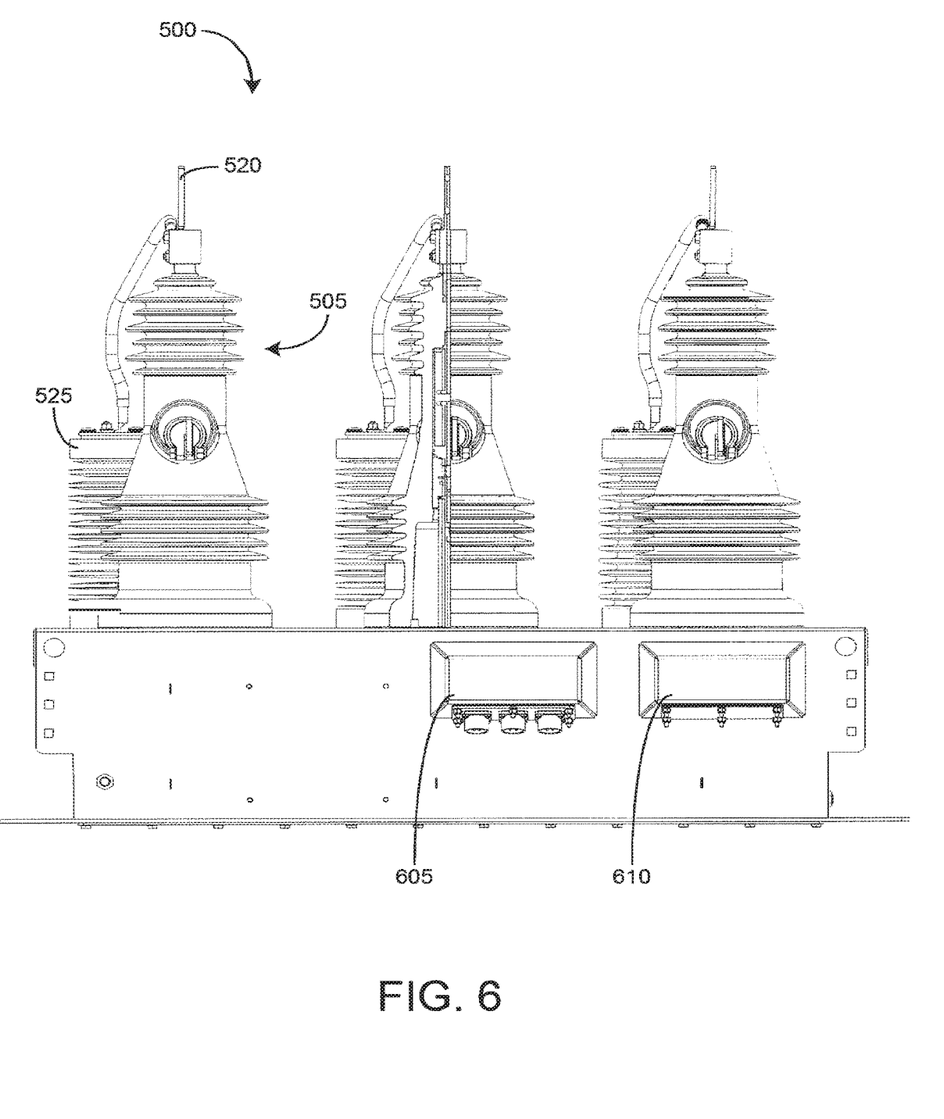
FIG. 6 is a back planar view of the control system of FIG. 5 according to an exemplary embodiment.

Referring now to FIG. 6, a back planar view of control system 500 of FIG. 5 is shown according to an exemplary embodiment. In this view, a power supply input interface 605 and a control input interface 610 of system 500 are shown. Control input interface 610 may be used to receive control input signals to control the operation of the switching devices for each phase and/or to calibrate system 500. For example, a technician may connect a computing device to one or more terminals of control input interface to provide calibration values to system 500, test system 500, manually open and/or close one or more of the switching devices, etc. In some embodiments, control input interface 610 may provide a separate control input for each phase of the three phase power source.

In some embodiments, control system 500 may be calibrated once (e.g., at a factory, during production) and may not need subsequent calibration to operate accurately once installed on a power grid node. Calibration may include defining a time delay from when the control circuit provides a signal to close the switching device until the time at which the contacts of the switching device are actually closed and in contact. Initial calibration may be accomplished by applying a voltage across the capacitor switch source and load main terminals. The control can be put in a calibration mode and use feedback regarding the voltage differential across the terminals to calculate the time delay (e.g., the time it takes from the transmission of the signal before the voltage differential approaches approximately zero). The time delay may be stored in the control circuit as a constant value. In some embodiments, a similar process may be used to provide a feedback to the control circuit during operation (e.g., for error detection and/or to make incremental adjustments to the time delay value due to changes in the switch response time).

Power supply input interface 605 may be used to receive operating power (e.g., 120 VAC, 50 Hz or 60 Hz, 1000 VA, etc.) for the switching devices (e.g., solenoid devices) from a power supply. Some controllers use energy stored in capacitors to operate the solenoid or actuator in the switch. Since capacitor energy varies with temperature, as does solenoid winding resistance, many variables may be used to account for proper temperature compensation.

One way to provide increased repeatability and consistency is to use a constant current power supply to power the switching devices. Solenoids devices, for example, have a set number of turns in their coils, and the output of the solenoid devices is based on the product of the number of turns and the current applied. Using a power supply that provides a constant current power signal to power the solenoid devices reduces the number and complexity of variables associated with changes in capacitance and/or solenoid winding resistance due to temperature. In some embodiments, a pulse width modulated (PWM) current-related drive signal may be used to compensate for coil temperature, power line voltage and/or power line impedance variations.

Figure 7:
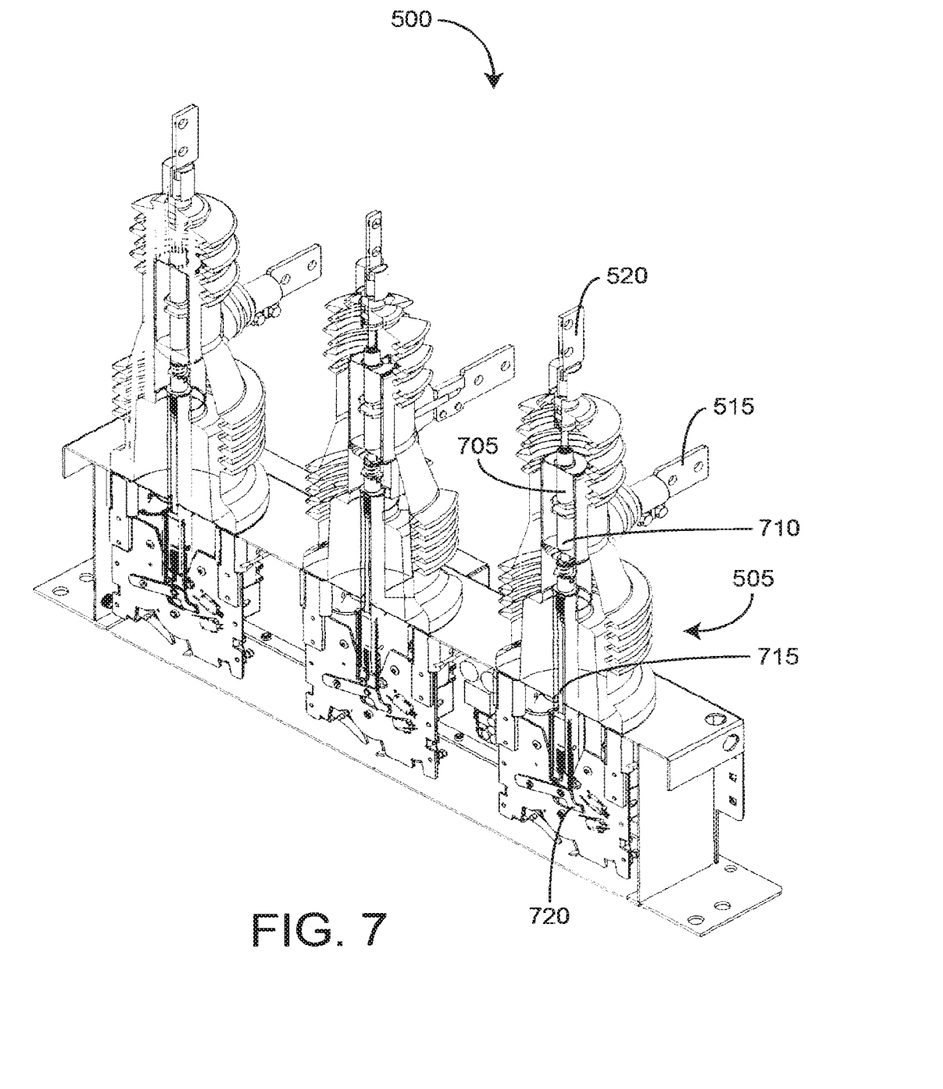
FIG. 7 is a perspective view of a lateral cross-section of the control system shown in FIG. 5 according to an exemplary embodiment.

Referring now to FIG. 7, a perspective view of a lateral cross-section of control system 500 shown in FIG. 5 is illustrated according to an exemplary embodiment. The illustrated cross-section shows a number of features of each single-phase system 505 that are concealed within housing 510. As illustrated in FIG. 7, each system 505 includes a vacuum interrupter-type switching device. In various embodiments, other types of switching devices may be used instead of a vacuum interrupter switch.

A switching device of system 505 includes two contactors, one for the source side of system 505 and one for the load or capacitor side of system 505. Load-side contactor 705 is electrically connected to capacitor terminal 520 to which the one or more capacitors for the phase are connected. Source-side contactor 710 is electrically connected to power source terminal 515 to which the respective phase of the three-phase power source is connected. In some embodiments, source-side contactor 710 may be electrically connected to an operating rod 715 and/or a control circuit.

Operating rod 715 is coupled (e.g., mechanically and/or electrically) to source-side contactor 710 and is used to move source-side contactor 710 into and out of contact with load-side contactor 705 to engage and disengage, respectively, electrical connectivity between the power source and the capacitor(s). Operating rod 715 is moved (e.g., up and down) using an actuator 720. In some embodiments, actuator 720 may include one or more solenoid devices configured to move operating rod 715 and, accordingly, source-side contactor 710. In some embodiments, operating rod 715 and/or actuator 720 may be designed in a different configuration and may be configured to move load-side contactor 705 instead of source-side contactor 710. The operation of actuator 720 may be controlled by a control circuit configured to determine when the contactors should be closed and/or opened based on electrical feedback from system 505 (e.g., voltage signals from voltage dividers on each of the load and source sides for each phase).

Figure 8:
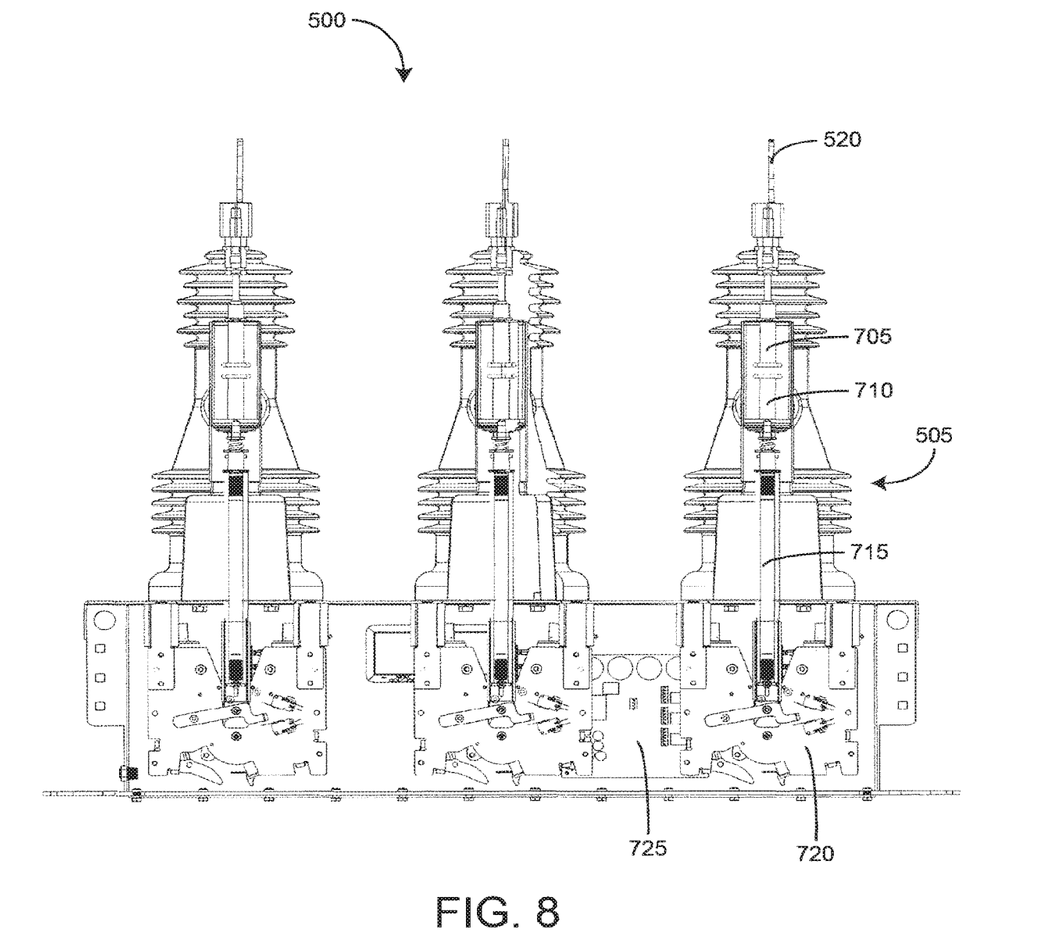
FIG. 8 is a front planar view of a lateral cross-section of the control system shown in FIG. 5 according to an exemplary embodiment.

Referring now to FIG. 8, a front planar view of a lateral cross-section of control system 500 shown in FIG. 5 is illustrated according to an exemplary embodiment. Control system 500 is shown as including a control circuit 725 that may be used to control the operation of the switching devices of one or more single-phase systems 505. Control circuit 725 may be similar to control circuit 105 shown in FIGS. 1 and 2 and may incorporate various features described herein with respect to control circuit 105.

Figure 9:
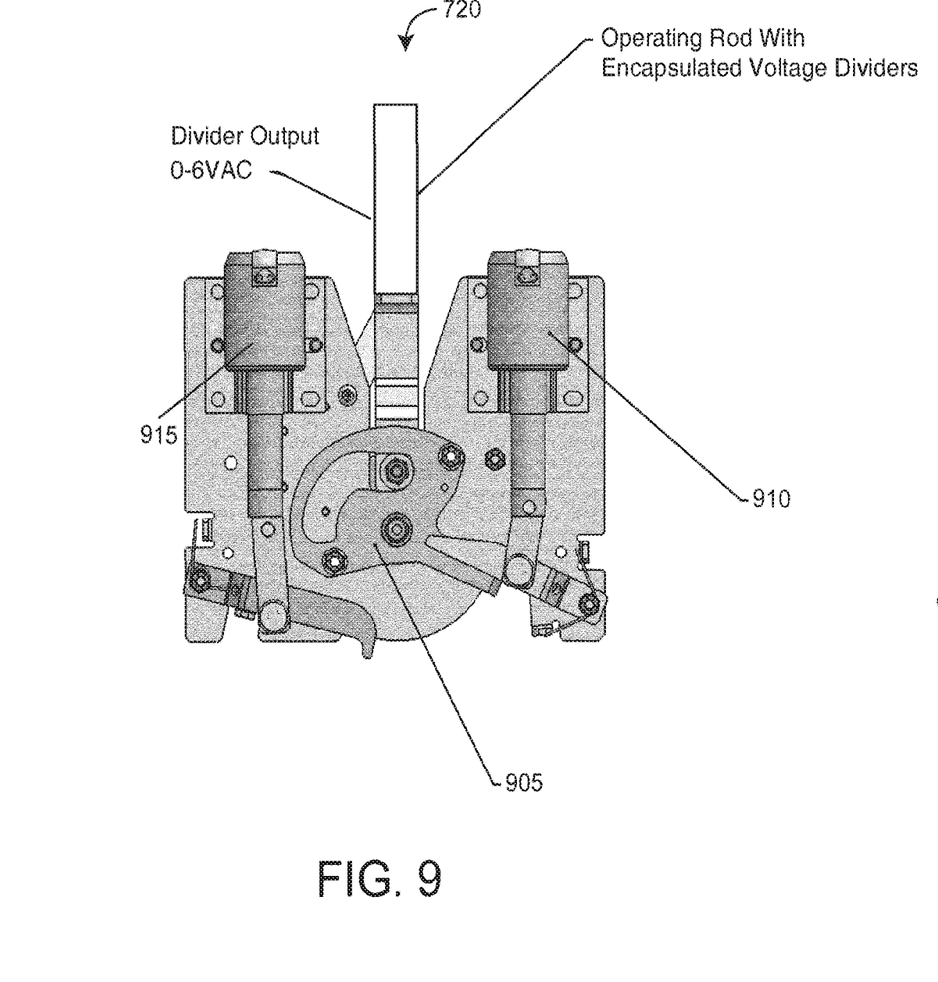
FIG. 9 is a front planar view of a switching device that may be used to connect and/or disconnect a voltage source to a switched capacitor according to an exemplary embodiment.

Referring now to FIG. 9, a front planar view of actuator 720 shown in FIGS. 7 and 8 is illustrated according to an exemplary embodiment. Actuator 720 includes an open solenoid device 910 configured to pull operating rod 715 and, accordingly, source-side contactor 710 down, breaking the electrical connection between the capacitors and power source. Actuator 720 also includes a close solenoid device 915 configured to push operating rod 715 and, accordingly, source-side contactor 710 up, engaging contact between contactors 705 and 710 and causing an electrical connection between the capacitors and power source. Solenoid devices 910 and 915 may move rod 715 through the use of a cam 905. As illustrated in FIG. 9, actuator 720 is in the open position. In some embodiments, actuator 720 may include a single solenoid device configured to perform both opening and closing functions and/or may include a different type of actuating device.

Figure 10:
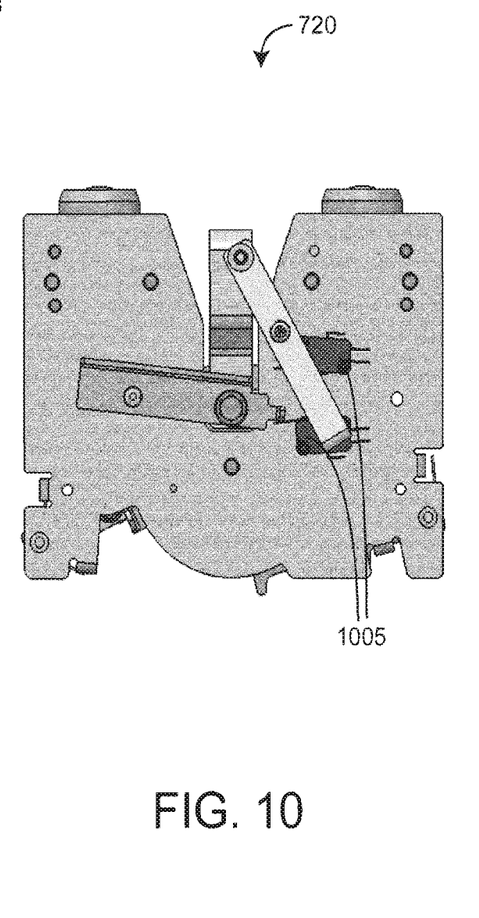
FIG. 10 is a rear planar view of the switching device of FIG. 9 according to an exemplary embodiment.

Referring now to FIG. 10, a rear planar view of actuator 720 shown in FIGS. 7 and 8 is illustrated according to an exemplary embodiment. Actuator 720 may include one or more auxiliary switches 1005. The auxiliary switches may be configured to interrupt the flow of current after execution of an open operation.

Figure 11:
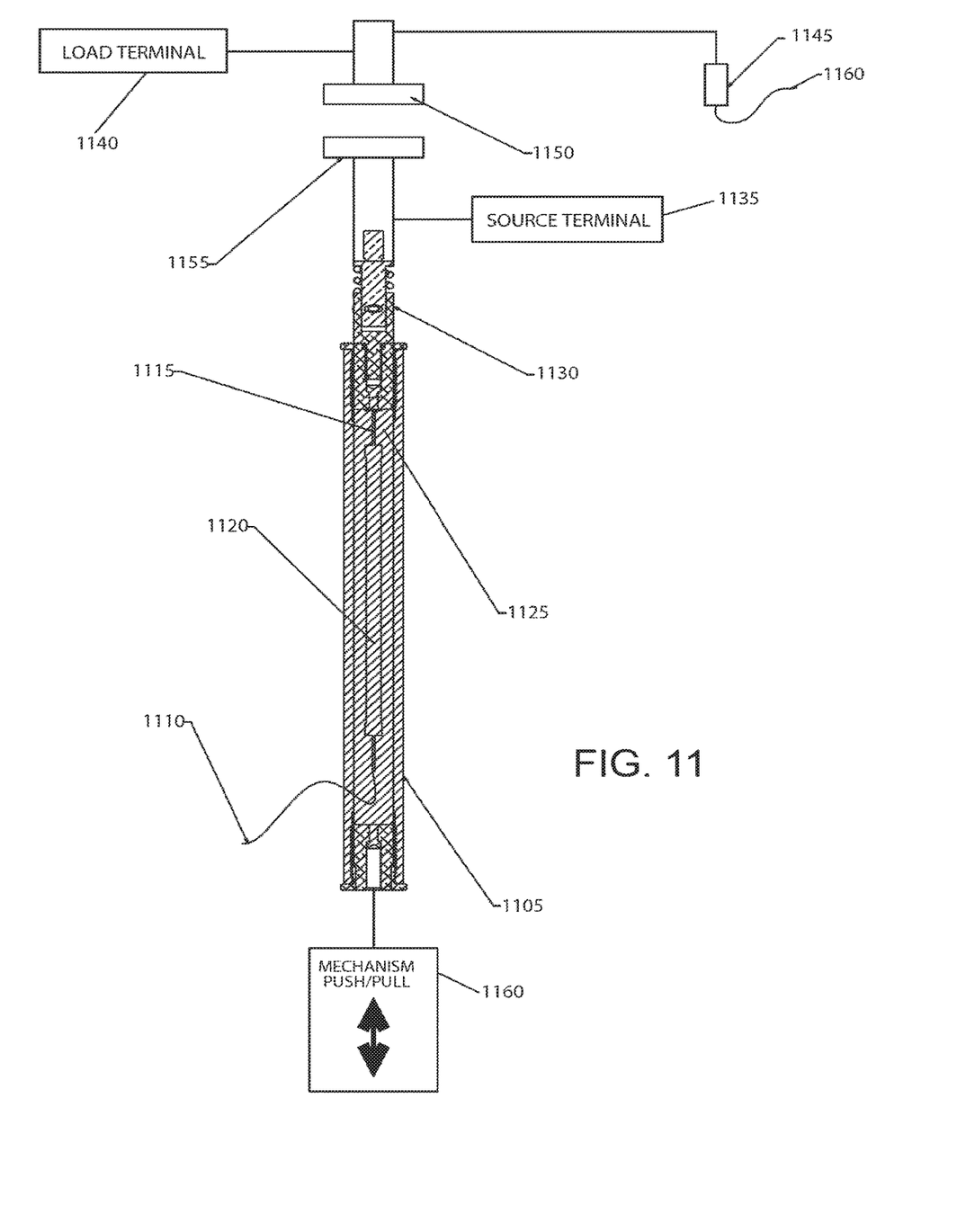
FIG. 11 is a schematic illustration of an operating rod that may be used in connecting and/or disconnecting a voltage source to a switched capacitor according to an exemplary embodiment.

Referring now to FIG. 11, a schematic illustration of an operating rod 1100 that may be used in connecting and/or disconnecting a voltage source to a switched capacitor is shown according to an exemplary embodiment. In various embodiments, operating rod 1100 may be used in conjunction with systems 100, 200 and/or 500, in the implementation of process 300, and/or as part of the electrical system illustrated in diagram 400, and may be utilized in combination with any of the various features described with reference to those systems.

Operating rod 1100 is coupled to a source-side switch contact 1155 (e.g., a vacuum interrupter contact) that is movable into and out of contact with a load-side switch contact 1150 (e.g., a stationary vacuum interrupter contact) through the use of a biasing mechanism 1160 (e.g., actuator 720). Rod 1100 may be coupled to contact 1155 through the use of a mechanical adapter 1130. Mechanical adapter 1130 may be made at least in part of conductive materials configured to transmit electricity through mechanical adapter 1130 without substantially impeding electrical flow. In some embodiments, mechanical adapter 1130 may include a biasing element such as a spring configured to promote a solid interface between contacts 1150 and 1155. Source-side switch contact 1155 may be electrically connected to a source terminal 1135 that is configured for connection to a power source, and load-side switch contact 1150 may be electrically connected to a load terminal 1140 that is configured for connection to one or more capacitors. Load-side switch contact 1150 may also be connected to a voltage divider 1145 (e.g., an external voltage divider), and a voltage sense lead 1160 (e.g., a low voltage sense wire tied to voltage divider 1145) may be provided for transmitting a load-side voltage signal from voltage divider 1145 to a control circuit.

Voltage sensing may be performed using capacitive coupling or using a voltage divider. Voltage dividers used to measure a terminal nearest a biasing mechanism may be created within a bushing in which the switching device (e.g., vacuum interrupter) is encapsulated.

In some embodiments, at last a portion of a source-side voltage divider may be positioned or embedded within operating rod 1100. A resistor 1120 (e.g., a high voltage, thick film resistor) is embedded within operating rod 1100 as illustrated in FIG. 11. Resistor 1120 may be electrically connected to contact 1155 and/or source terminal 1135 (e.g., through mechanical adapter 1130) on a high voltage side of resistor 1120 using an electrical lead 1115. A voltage sense lead 1110 may be connected to a low voltage side of resistor 1120 and used to provide a voltage signal (e.g., a high voltage signal for a second resistor of the voltage divider) to a control circuit. Resistor 1120 may be enclosed within an encapsulation 1125 (e.g., a material such as urethane). Encapsulating resistor 1120 in urethane may help provide for a dielectric capability, mechanical shock absorption, tolerance of thermal expansion, thermal dissipation, an ability to sense the voltage on the terminal nearest the biasing mechanism 1160, and/or other benefits. In some embodiments, an outer surface 1105 of operating rod 1100 may include a rigid dielectric tube.

As illustrated, operating rod 1100 encloses only a portion, or a single resistor, of the source-side voltage divider. The second resistor of the source-side voltage divider may be provided elsewhere in the system, such as on a circuit board associated with a control circuit. In some embodiments, resistor 1120 may be a high-voltage resistor configured for use with high voltages that may be experienced in a power grid application, and the second resistor may be a lower-voltage resistor configured such that the voltage sensed across the second resistor by a control circuit is low enough to avoid damaging the electronics of the control circuit. In some embodiments, both resistors of the voltage divider may be positioned and/or encapsulated within operating rod 1100.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure may include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., nontransitory medium) which can be used to carry or store desired program code in the form of machine-executable instructions or data structures and which can be accessed by a general purpose or special purpose computer or other machine with a processor. Combinations of the above are also included within the scope of machine-readable media. Machine executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of controlling the connection of a multiple phase power source to a plurality of capacitors, wherein each phase of the multiple phase power source is electrically connectable to at least one of the plurality of capacitors through a switching device, the method comprising:

for each phase of the multiple phase power source:
determining a first voltage using a first voltage divider, the first voltage divider having a first high voltage resistor and a first low voltage resistor, wherein the first voltage is equal to a voltage across the first low voltage resistor;
determining a second voltage across using a second voltage divider, the second voltage divider having a second high voltage resistor and a second low voltage resistor, wherein the second voltage is equal to a voltage across the second low voltage resistor; and
generating a close signal when the difference between the first voltage and the second voltage is approximately zero;

wherein the switching device includes a rod configured to be moved between a first position in which the switching device is in an open position and a second position in which the switching device is in a closed position, and wherein the method further comprises positioning at least a portion of one of the first voltage divider or the second voltage divider within the rod.

2. The method of claim 1, wherein the first voltage corresponds to a power signal for the respective phase of the power source and the second voltage corresponds to a capacitor that is electrically connected to the switching device for the phase.

3. The method of claim 1, wherein the close signal is generated before the capacitor is fully discharged.

4. The method of claim 1, wherein the portion of the voltage divider that is positioned within the rod comprises at least one high voltage thick film resistor.

5. The method of claim 4, further comprising encapsulating the at least one resistor within a urethane material.

6. The method of claim 1, wherein generating the close signal configured to cause the switching device for the phase to close comprises generating the close signal a predetermined time prior to when the difference between the first voltage and the second voltage is expected to approach approximately zero, wherein the predetermined time is based on a time delay between a time when the switching device receives the close signal and a time when the switching device comes to rest in a closed position.

7. The method of claim 6, wherein the time delay is determined by applying a voltage across the first and second terminals of the switching device at a first time, closing the switching device, and determining a second time at which the voltage approaches approximately zero, wherein the time delay comprises the difference between the first time and the second time.

8. A control system for controlling the connection of a multiple phase power source to a plurality of capacitors, wherein each phase of the multiple phase power source is electrically connectable to at least one of the plurality of capacitors through a switching device, the control system comprising: a control circuit configured to, for each phase of the multiple phase power source: determine a first voltage using a first voltage divider, the first voltage divider having a first high voltage resistor and a first low voltage resistor, wherein the first voltage is equal to a voltage across the first low voltage resistor; determine a second voltage using a second voltage divider, the second voltage divider having a second high voltage resistor and a second low voltage resistor, wherein the second voltage is equal to a voltage across the second low voltage resistor; and generate a close signal when the difference between the first voltage and the second voltage is approximately zero, wherein the switching device comprises a rod configured to be moved between a first position in which the switching device is in an open position and a second position in which the switching device is in a closed position, and wherein at least a portion of one of the first voltage divider or the second voltage divider are positioned within the rod.

9. The control system of claim 8, wherein the first voltage corresponds to a power signal for the respective phase of the power source and the second voltage corresponds to a capacitor that is electrically connected to the switching device for the phase.

10. The control system of claim 8, wherein the control circuit is configured to generate the close signal before the capacitor is fully discharged.

11. The control system of claim 8, wherein the portion of the voltage divider that is positioned within the rod comprises at least one high voltage thick film resistor.

12. The control system of claim 11, wherein the at least one resistor is encapsulated within a urethane material.

13. The control system of claim 8, wherein the control circuit is configured to generate the close signal a predetermined time prior to when the difference between the first voltage and the second voltage is expected to approach approximately zero, wherein the predetermined time is based on a time delay between a time when the switching device receives the close signal and a time when the switching device comes to rest in a closed position.

14. A method of controlling the connection of a multiple phase power source to a plurality of capacitors, wherein each phase of the multiple phase power source is electrically connectable to at least one of the plurality of capacitors through a switching device, the method comprising:
for each phase of the multiple phase power source:
determining a first voltage of a power signal for the respective phase of the power source;
determining a second voltage across a capacitor that is electrically connected to a second terminal of the switching device for the phase; and
generating a close signal when the difference between the first voltage and the second voltage is approximately zero;
wherein the switching device includes a rod configured to be moved between a first position in which the switching device is in an open position and a second position in which the switching device is in a closed position;
wherein at least a portion of at least one selected from a group consisting of a first voltage divider and a second voltage divider are positioned within the rod.

15. The method of claim 14, wherein the close signal is generated before the capacitor is fully discharged.

16. The method of claim 14, wherein the first voltage is determined via a first voltage divider and the second voltage is determined via a second voltage divider.

* * * * *